United States Patent
Ma et al.

(10) Patent No.: US 6,843,748 B2
(45) Date of Patent: Jan. 18, 2005

(54) TRANSMISSION MECHANISM WITH A SINGLE DIFFERENTIAL MECHANISM FOR DRIVING FOUR WHEELS

(75) Inventors: Weijin Ma, Urumchi (CN); Mingxue Yang, Urumchi (CN); Yujiang Wang, Urumchi (CN); Yingpu Wang, Urumchi (CN); Bin Lang, Urumchi (CN); Yongge Fan, Miquan (CN); Wenbin Pan, Urumchi (CN); Feng Gao, Beijing (CN)

(73) Assignee: Xinjiang Shengsheng Co., Ltd., Urumchi (CN)

( * ) Notice: Subject to any disclaimer, the term of this patent is extended or adjusted under 35 U.S.C. 154(b) by 0 days.

(21) Appl. No.: 10/659,724

(22) Filed: Sep. 10, 2003

(65) Prior Publication Data

US 2004/0087406 A1 May 6, 2004

(30) Foreign Application Priority Data

Sep. 12, 2002 (CN) .......................................... 02253906

(51) Int. Cl.$^7$ ............................................... F16H 48/06
(52) U.S. Cl. ........................ 475/221; 475/198; 475/200; 475/203; 475/206; 475/225; 74/329; 74/331; 180/233; 180/247; 180/248
(58) Field of Search ................................. 475/198, 200, 475/203, 206, 221, 225; 74/329, 331; 180/233, 247, 248

(56) References Cited

U.S. PATENT DOCUMENTS

| 2,072,057 A | * | 2/1937 | Rauen ..................... 192/219.3 |
| 2,158,320 A | * | 5/1939 | Bock ......................... 475/201 |
| 3,753,376 A | * | 8/1973 | Ribeiro ................. 74/665 GA |
| 2004/0092354 A1 | * | 5/2004 | Ma et al. .................... 475/200 |

FOREIGN PATENT DOCUMENTS

EP    444497 A1  *  9/1991    ........... F16H/03/08

* cited by examiner

Primary Examiner—Charles A Marmor
Assistant Examiner—David D. Le
(74) Attorney, Agent, or Firm—Garvey, Smith, Nehrbass & Doody, L.L.C.; Seth M. Nehrbass; Brett A. North

(57) ABSTRACT

The present invention provides a transmission mechanism with a single differential mechanism for an automotive vehicle. The transmission mechanism of the invention is of a compact structure and a relatively less cost of manufacturing, and makes a clearance between the chassis of the automotive vehicle and the ground increased. The performance of the automotive vehicle equipped with the transmission mechanism of the invention can be improved.

15 Claims, 3 Drawing Sheets

TRANSMISSION MECHANISM WITH A SINGLE DIFFERENTIAL MECHANISM FOR DRIVING FOUR WHEELS

Priority is claimed to Chinese application number 02253906.9, filed Sep. 12, 2002, which is incorporated herein by reference.

BACKGROUND OF THE INVENTION

1. Field of the Invention

The present invention relates to a transmission mechanism of automotive vehicles, and more particularly to a transmission mechanism with a single differential mechanism for driving four wheels thereof.

2. Description of the Related Art

Many transmission mechanisms with a differential gear lock limiting mechanism have been used in automotive vehicles. Because when an automotive vehicle encounters weaker roads, such as loose soil, foothill and the like, two wheels of the automotive vehicle at the same side may lose adhesions to the ground, which will cause the wheels skidding. The differential gear lock limiting mechanism can limit different rotating speeds of the two wheels up to locking the differential gear of the automotive vehicle. In this case, however, the driving side shafts of the two sides will be integrated, and the automotive vehicle can only be driven in line. Moreover, the differential gear lock limiting mechanism used in the art is complicated, expensive and difficult to maintain.

Hence, a transmission mechanism that overcomes the above-mentioned problems is needed.

SUMMARY OF THE INVENTION

Accordingly, an object of the present invention is to provide a transmission mechanism that overcomes the shortcomings in the prior art.

In order to achieve the above-mentioned object, a transmission mechanism with a single differential mechanism for an automotive vehicle in accordance with the present invention comprises a drive housing having a first bearing bracket disposed at the upper portion thereof, a second bearing bracket and a third bearing bracket disposed at the middle portion thereof, a fourth bearing bracket disposed at the right lower portion thereof, and a fifth bearing bracket disposed at the left lower portion thereof; a differential mechanism including a right side bevel gear, a left side bevel gear, a left ring gear and a right ring gear, planetary gears, and differential cases; a driving power input shaft mounted within the first bearing bracket; a first gear mounted on the driving power input shaft; a first dual tandem gear mounted on the driving power input shaft; a first sliding dual tandem gear slidably mounted on the driving power input shaft; a second sliding dual tandem gear slidably mounted on the driving power input shaft and engaged to the first sliding dual tandem; a front left wheel output shaft mounted within the second bearing bracket, on which the left side bevel gear is mounted; a rear right wheel output shaft mounted within the third bearing bracket, on which the right side bevel gear is mounted; a second gear fixed to the front left wheel output shaft; a second dual tandem gear mounted on the front left wheel output shaft; a third gear connected with a right side bevel gear; a front right wheel output shaft mounted within the fourth bearing bracket; a first connecting shaft connected with the front right wheel output shaft via a first slidable engaging member; a fourth gear fixed to the first connecting shaft and meshing with the third gear; a rear left wheel output shaft mounted within the fifth bearing bracket; a second connecting shaft connected to the rear left wheel output shaft via a second slidable engaging member; and a fifth gear fixed to the concentric shaft and meshing with the second gear. Wherein when the driving power input shaft is driven, the first sliding gear can be regulated to mesh with the left ring gear or the second sliding gear can be regulated to mesh with the right ring gear so that the automotive vehicle can obtain different speeds, and wheels at the same side of the automotive vehicle can be driven at the same time.

In an embodiment of the invention, the front left wheel output shaft, the rear left wheel output shaft, the front right wheel output shaft, and the rear right wheel output shaft are disposed at a same plane to obtain a largest space between the chassis of the vehicle and the ground.

In another embodiment of the invention, the first sliding dual tandem gear provides an inner gear to mesh with a first smaller gear of the first dual tandem gear.

In a further embodiment of the invention, the second dual tandem gear includes a second larger gear and a second smaller gear to respectively mesh with the first gear and the first larger gear of the first dual tandem gear.

In the invention, the sliding gears may be splined to the driving power input shaft, and each of the sliding gears and the slidable engaging members can provide a recess at the outer surface thereof for connecting a fork.

Compared to the prior art, a single differential mechanism is used in the transmission mechanism of the present invention to drive four wheels, and the four output shafts are disposed at the same plane. Therefore, the transmission mechanism of the invention is of a compact structure and a relatively less cost of manufacturing, and makes a clearance between the chassis of the automotive vehicle and the ground increased. As a result, the performance of the automotive vehicle is improved and the automotive vehicle can be steered smoothly. Furthermore, the single differential mechanism of the invention may generate different speeds between the left side wheels and the right side wheels, and can obtain the same performance as those with two differential mechanisms in the prior art.

Other objects, features and advantages of the present invention will become apparent from the following detailed description in conjunction with the accompanying drawings.

DETAILED DESCRIPTION OF PREFERRED EMBODIMENTS OF THE INVENTION

The present invention will be further described below with reference to the drawings.

Figure 1:
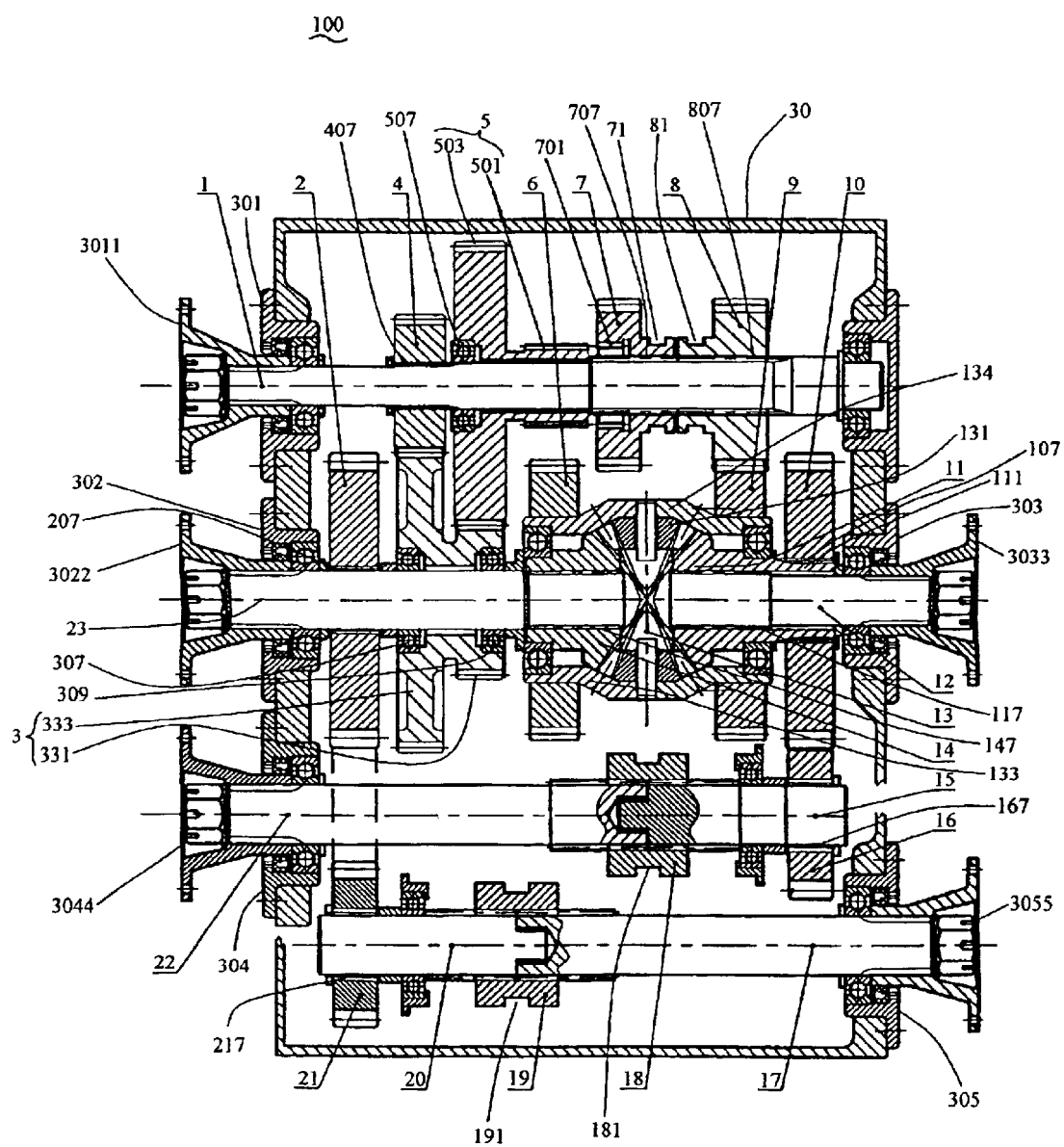
FIG. 1 is a schematic plan view of a transmission mechanism in accordance with the present invention.
Figure 2:
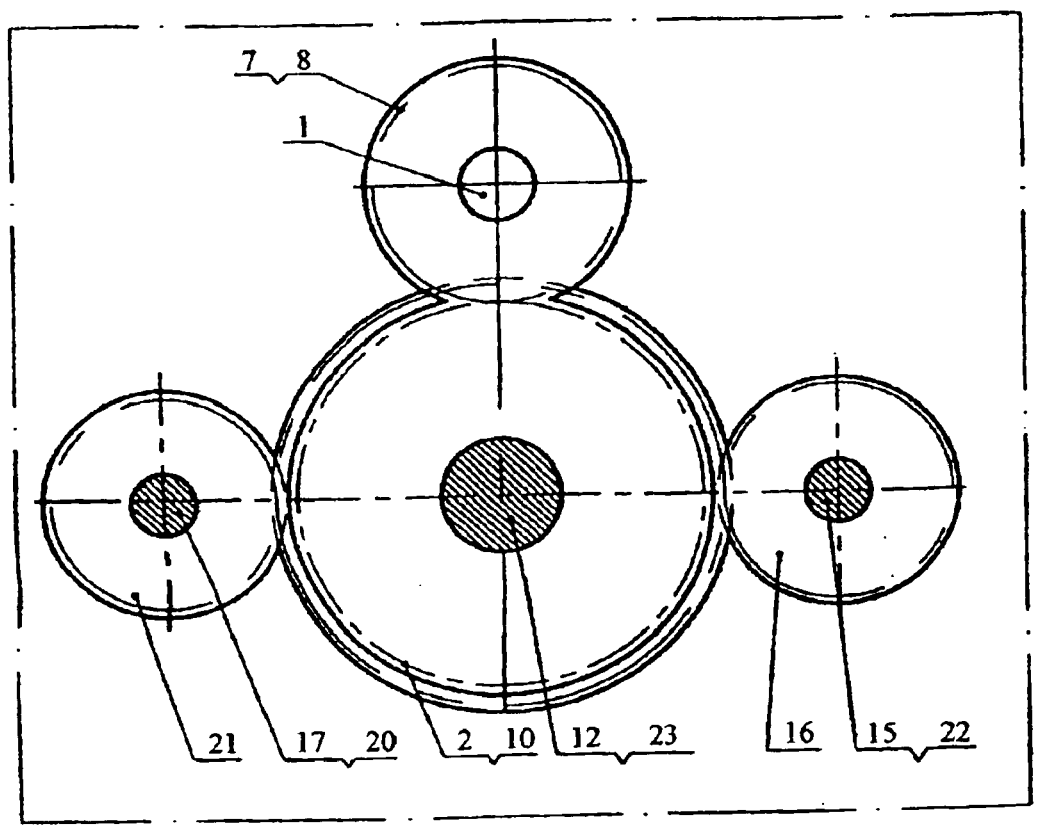
FIG. 2 is a schematic and sketching side view showing the location of shafts of the transmission mechanism as shown in FIG. 1.
Figure 3:
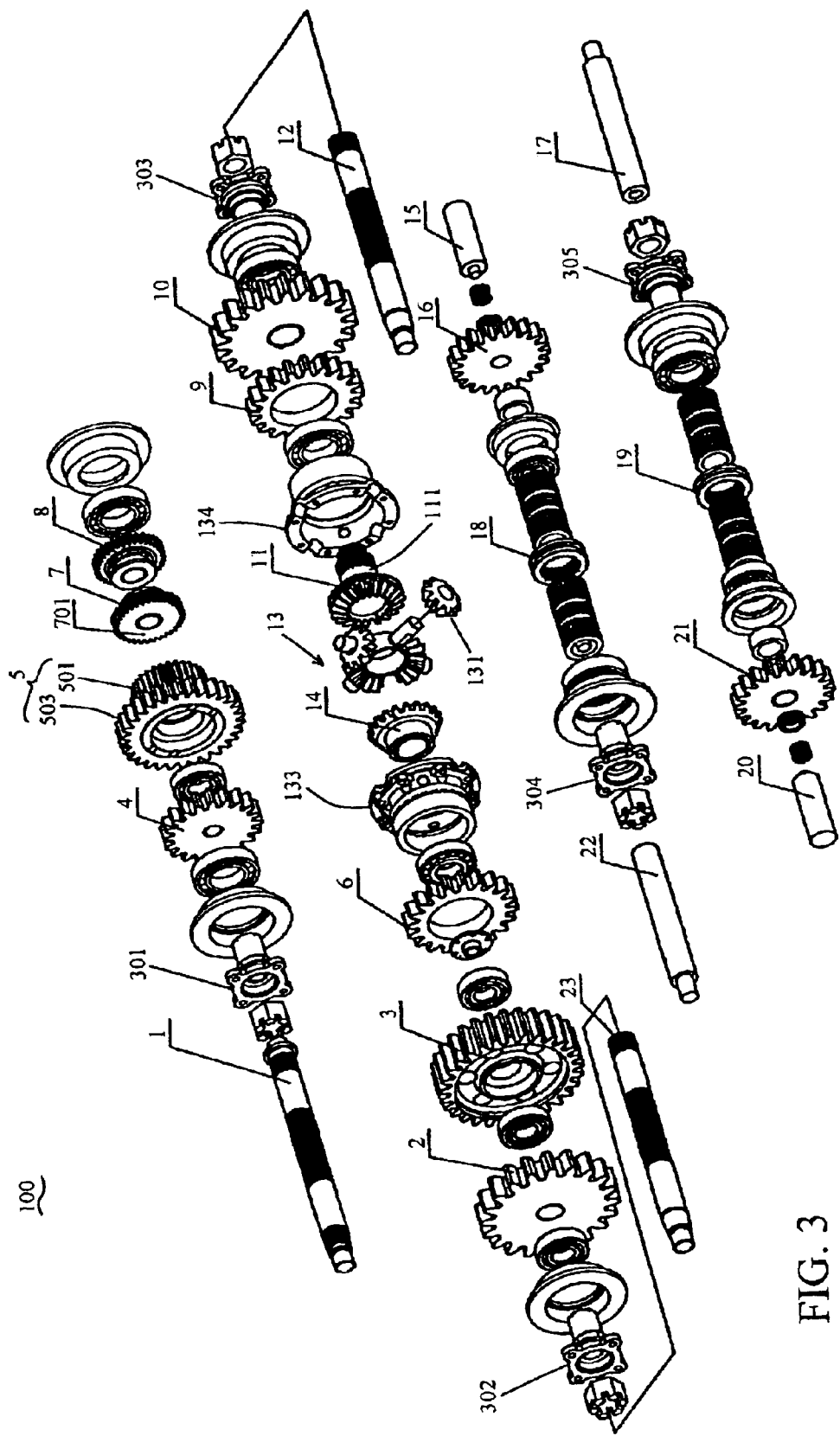
FIG. 3 is a schematically exploded view of a transmission mechanism in accordance with the present invention as shown in FIG. 1.

Referring to FIGS. 1 to 3, a transmission mechanism 100 of an automotive vehicle in accordance with the present invention comprises a drive housing 30, a driving power input shaft 1, a front left wheel output shaft 23, a rear right wheel output shaft 12, a front right wheel output shaft 22, a rotating shaft 15, a rear left wheel output shaft 17, a concentric shaft 20, and a differential mechanism 13 mounted at the lower portion of the drive housing 30. The differential mechanism 13 includes a right side bevel gear 11, a left side bevel gear 14, a left ring gear 6 and a right ring gear 9, planetary gears 131 and differential cases 133, 134. The drive housing 30 provides a first bearing bracket 301 disposed at the upper portion thereof, a second bearing bracket 302, a third bearing bracket 303 disposed at the middle portion thereof, a fourth bearing bracket 304 disposed at the right lower portion thereof, and a fifth bearing bracket 305 disposed at the left lower portion thereof.

The driving power input shaft 1 is connected with an engine (not shown) of the automotive vehicle via a first connecting member 3011 and mounted within the first bearing bracket 301. A first gear 4 is mounted to the driving power input shaft 1 via a spline 407. A first dual tandem gear 5 having a first larger gear 503 and a first smaller gear 501 is mounted on the input shaft 1 via a ball bearings 507. A first sliding dual tandem gear 7 and a second sliding dual tandem gear 8 are mounded on the input shaft 1 via a ball bearing 707 and a spline 807, respectively, and can move along the input shaft 1. The first sliding dual tandem gear 7 provides an inner gear 701 to mesh with the first smaller gear 501.

The front left wheel output shaft 23 is connected with a front right wheel (not shown) of the automotive vehicle via a second connecting member 3022, and mounted within the second bearing bracket 302. A second gear 2 is mounted on the front left wheel output shaft 23 via a spline 207. A second dual tandem gear 3 having a second larger gear 333 meshing with the first gear 4 and a second smaller gear 331 meshing with the first larger gear 503 is mounted on the front left wheel output shaft 23 via a ball bearing 307 and a ball bearing 309.

The rear right wheel output shaft 12 is connected with a rear right wheel (not shown) of the automotive vehicle via a third connecting member 3033, and mounted within the third bearing bracket 303.

Elements of the differential mechanism 13 in this invention are the same as those in the prior art except those specifically described herein. The right side bevel gear 11 and the left side bevel gear 14 mesh with the planetary gear 131, and are mounted on the rear right wheel output shaft 12 and the front left wheel output shaft 23 via splines 117 and 147, respectively. The left ring gear 6 and the right ring gear 9 are splined to the differential cases 133, 134 of the differential mechanism 13 to mesh with the first sliding gear 7 and the second sliding gear 8, respectively. A third gear 10 is mounted on a shaft sleeve 111 of the right side bevel gear 11 via a spline 107.

The front right wheel output shaft 22 is connected with a front left wheel (not shown) of the automotive vehicle via a fourth connecting member 3044 and mounted within the fourth bearing bracket 304. A first connecting shaft 15 with one end is coaxially connected via a first slidable engaging member 18 to the front right wheel output shaft 22. A fourth gear 16 is mounted on the other end of the shaft 15 via a spline 167 to mesh with the third gear 10.

The rear left wheel output shaft 17 is connected with a rear left wheel (not shown) of the automotive vehicle via a fifth connecting member 3055 and is mounted within the fifth bearing bracket 305. A second connecting shaft 20 with one end is coaxially connected via a second slidable engaging member 19 to the rear left wheel output shaft 17. A fifth gear 21 is mounted on the other end of the shaft 15 via a spline 217 to mesh with the first gear 2.

Recesses 71, 81, 181 and 191 are provided at the outer surface of the first sliding gear 7, the second sliding gear 8, the first slidable engaging member 18 and the second slidable engaging member 19, respectively, to accommodate forks (not shown) that extend out of the drive housing 30.

The operation of the transmission mechanism 100 of the present invention will now be described as follows. The driving power is transmitted to the first gear 4 and the second sliding dual tandem gear 8 through the driving power input shaft 1. The first sliding dual tandem gear 7 and the second sliding dual tandem gear 8 meshing with each other can be regulated to make the differential mechanism 13 obtain different speeds. That is, the second sliding dual tandem gear 8 can be regulated to mesh with the right ring gear 9 to make the differential mechanism 13 rotate at a higher speed or it moves leftwards along the shaft 1 together with so that the first sliding dual tandem gear 7 meshes with the first smaller gear 501 and the left ring gear 6 to make the differential mechanism 13 rotate at a lower speed.

The driving power through the differential mechanism 13 is distributed to the right side bevel gear 11 and the left side bevel gear 14. The driving power through the right side bevel gear 11 is divided into two portions. One is transmitted to the rear right wheel output shaft 12 directly. Another portion is transmitted to the connecting shaft 15 via the third gear 10 and the fourth gear 16, and then transmitted to the front right wheel output shaft 22 via the first slidable engaging member 18.

The driving power through the left side bevel gear 14 is also divided into two portions. One is transmitted to the front left wheel output shaft 23 directly. Another portion is transmitted to the connecting shaft 20 via the second gear 2 and the fifth gear 21, and then transmitted to the rear left wheel output shaft 17 via the second slidable engaging member 19.

When an automotive vehicle equipped the transmission mechanism of the invention moves and a wheel skids and loses the adhesion to the ground, the vehicle will keep moving because the unskidding wheels still works. When two wheels at the same side skid, two wheels at the other side will obtain more power to keep the vehicle going, and when two wheels at different sides, remaining unskiding wheels will also obtain more power through the differential mechanism to keep the vehicle moving.

It is understood that the particular structures embodying the present invention shown and described above are only used for illustrating the present invention, and are not intended to limit the invention. Any modifications or variations to the present invention without departing from the spirit of the invention shall be fallen into the scope of the invention defined by the appended claims.

What is claimed is:

1. A transmission mechanism with a single differential mechanism for an automotive vehicle comprising:

a drive housing (30) having a first bearing bracket (301) disposed at the upper portion thereof, a second bearing bracket (302) and a third bearing bracket (303) disposed at the middle portion thereof, a fourth bearing bracket (304) disposed at the right lower portion thereof, and a fifth bearing bracket (305) disposed at the left lower portion thereof;

the differential mechanism (13) including a right side bevel gear (11), a left side bevel gear (14), a left ring gear (6) and a right ring gear (9), planetary gears (131), and differential cases (133, 134);

a driving power input shaft (1) mounted within said first bearing bracket (301);

a first gear (4) mounted on said driving power input shaft (1);

a first dual tandem gear (5) mounted on said driving power input shaft (1);

a first sliding dual tandem gear (7) slidably mounted on said driving power input shaft (1);

a second sliding dual tandem gear (8) slidably mounted on said driving power input shaft (1) and engaged to said first sliding dual tandem (7);

a front left wheel output shaft (23) mounted within said second bearing bracket (302), on which said left side bevel gear (14) is mounted;

a rear right wheel output shaft (12) mounted within said third bearing bracket (303), on which said right side bevel gear (11) is mounted;

a second gear (2) fixed to said front left wheel output shaft (23);

a second dual tandem gear (3) mounted on said front left wheel output shaft (23);

a third gear (10) connected with a right side bevel gear (11);

a front right wheel output shaft (22) mounted within said fourth bearing bracket (304);

a first connecting shaft (15) connected with said front right wheel output shaft (22) via a first slidable engaging member (18);

a fourth gear (16) fixed to said first connecting shaft (15) and meshing with said third gear (10);

a rear left wheel output shaft (17) mounted within said fifth bearing bracket (305);

a second connecting shaft (20) connected to said rear left wheel output shaft (17) via a second slidable engaging member (19); and a fifth gear (21) fixed to said concentric shaft (15) and meshing with said second gear (2), wherein when said driving power input shaft (1) is driven, said first sliding gear (7) can be regulated to mesh with said left ring gear (6) or said second sliding gear (8) can be regulated to mesh with said right ring gear (9) so that the automotive vehicle can obtain different speeds, and wheels at the same side of the automotive vehicle can be driven at the same time.

2. The transmission mechanism of claim 1, wherein said sliding gear (2) is splined to said driving power input shaft (1).

3. The transmission mechanism of claim 1, wherein each of said first sliding gear (7), said second sliding gear (8), said first slidable engaging member (18) and said second slidable engaging member (19) provides a recess (71, 81, 181, 191) at the outer surface thereof for connecting a fork, respectively.

4. The transmission mechanism of claim 1, wherein said second dual tandem gear (3) includes a second larger gear (333) and a second smaller gear (331) to respectively mesh with said first gear (4) and said first larger gear (503) of said first dual tandem gear (5).

5. The transmission mechanism of claim 4, wherein each of said first sliding gear (7), said second sliding gear (8), said first slidable engaging member (18) and said second slidable engaging member (19) provides a recess (17, 81, 181, 191) at the outer surface thereof for connecting a fork, respectively.

6. The transmission mechanism of claim 1, wherein said first sliding dual tandem gear (7) provides an inner gear (701) to mesh with a first smaller gear (501) of said first dual tandem gear (5).

7. The transmission mechanism of claim 6, wherein said second dual tandem gear (3) includes a second larger gear (333) and a second smaller gear (331) to respectively mesh with said first gear (4) and said first larger gear (503) of said first dual tandem gear (5).

8. The transmission mechanism of claim 6, wherein each of said first sliding gear (7), said second sliding gear (8), said first slitable engaging member (18) and said second slidable engaging member (19) provides a recess (71, 81, 181, 191) at the outer surface thereof for connecting a fork, respectively.

9. The transmission mechanism of claim 1, wherein said front left wheel output shaft (23), said rear left wheel output shaft (17), said from right wheel output shaft (22), and said rear right wheel output shaft (12) are disposed at a same plane.

10. The transmission mechanism of claim 9, wherein said sliding gear (2) is splined to said driving power input shaft (1).

11. The transmission mechanism of claim 9, wherein said second dual tandem gear (3) includes a second larger gear (333) and a second smaller gear (331) to respectively mesh with said first gear (4) and said first larger gear (503) of said first dual tandem gear (5).

12. The transmission mechanism of claim 9, wherein each of said first sliding gear (7), said second sliding gear (8), said first slidable engaging member (18) and said second slidable engaging member (19) provides a recess (71, 81, 181, 191) at the outer surface thereof for connecting a fork, respectively.

13. The transmission mechanism of claim 9, wherein said first sliding dual tandem gear (7) provides an inner gear (701) to mesh with a first smaller gear (501) of said first dual tandem gear (5).

14. The transmission mechanism of claim 13, wherein said second dual tandem gear (3) includes a second larger gear (333) and a second smaller gear (331) to respectively mesh with said first gear (4) and said first larger gear (503) of said first dual tandem gear (5).

15. The transmission mechanism of claim 13, wherein each of said first sliding gear (7), said second sliding gear (8), said first slidable engaging member (18) and said second slidable engaging member (19) provides a recess (71, 81, 181, 191) at the outer surface thereof for connecting a fork, respectively.

* * * * *